United States Patent [19]

Abe

[11] Patent Number: 4,958,240
[45] Date of Patent: Sep. 18, 1990

[54] ORIGINAL READING APPARATUS APPLYING A LAMP VOLTAGE TO CORRECT LAMP BLACKENING

[75] Inventor: Shunichi Abe, Yokohama, Japan

[73] Assignee: Canon Kabushiki Kaisha, Tokyo, Japan

[21] Appl. No.: 198,515

[22] Filed: May 25, 1988

[30] Foreign Application Priority Data

May 25, 1987 [JP] Japan .................................. 62-127798

[51] Int. Cl.$^5$ ............................................. H04M 1/04
[52] U.S. Cl. ................................................... 358/475
[58] Field of Search ......................... 358/471, 474, 475

[56] References Cited

U.S. PATENT DOCUMENTS

| | | | |
|---|---|---|---|
| 3,833,761 | 9/1974 | Houck | 358/475 |
| 4,677,287 | 6/1987 | Ejima | 250/205 |
| 4,688,099 | 8/1987 | Funston | 358/475 |
| 4,700,236 | 10/1987 | Abe | 358/284 |
| 4,796,093 | 1/1989 | Asano | 358/475 |

Primary Examiner—Edward L. Coles, Sr.
Attorney, Agent, or Firm—Fitzpatrick, Cella, Harper & Scinto

[57] ABSTRACT

An original reading apparatus which prevents lamp blackening includes a lamp for illuminating the original, and reading circuitry for reading an image formed on the illuminated original. Control circuitry is provided to apply to the lamp a first predetermined voltage after reading the image formed on the original has been completed, if a voltage applied to the lamp at the time of original image reading is lower than a second predetermined voltage. The first predetermined voltage is higher than the voltage applied to the lamp at the time of the original image reading.

9 Claims, 4 Drawing Sheets

ORIGINAL READING APPARATUS APPLYING A LAMP VOLTAGE TO CORRECT LAMP BLACKENING

BACKGROUND OF THE INVENTION

1. Field of the Invention

This invention relates to an apparatus for reading an original.

2. Description of the Prior Art

In a known original reading apparatus, a transmission type of original such as a negative or positive film is illuminated by a halogen lamp, and light transmitted through the original is projected on a projection surface to form an image thereon. The projection surface is disposed, for example, above a reading means such as a CCD (charge coupled device), thereby enabling the projected image formed on the projection surface to be read. In an arrangement enabling reading of an projected image, there is a possibility of the density of the image varying depending on the type of film used as the transmission original or on the state of exposure when the image is picked up from the film. To minimize reading failures caused thereby, a control operation is carried out, which changes the voltage applied to the halogen lamp that illuminates the transmission original on the basis of a signal corresponding to the density of the original so as to enable the original to be read.

This control is performed in such a manner that, in the case of a negative film formed by over-exposure, the voltage applied to the halogen lamp is heightened to increase the quantity of light emitted from the lamp, or that, in the case of a negative film formed by under-exposure, the voltage applied to the halogen lamp is lowered to reduce the quantity of emitted light. In the case of a positive film, the control is such that the voltage applied to the halogen lamp is lowered since the transmittance of the positive film is larger than that of an ordinary negative film.

However, if, in this conventional method, the voltage applied to the halogen lamp is lowered, the value of calorification from the filament of the halogen lamp is reduced, and the temperature of the lamp wall decreases so that the halogen cycle is not smoothly effected and halogen compounds blacken the inner surface of the lamp wall by attaching thereto, resulting in a reduction in the amount of illumination light or in unevenness of light quantity distribution.

SUMMARY OF THE INVENTION

It is therefore an object of the present invention to provide an original reading apparatus capable of preventing a reduction in the performance of the lamp while reading an original by lighting up the lamp at a low voltage.

It is another object of the present invention to provide an original reading apparatus capable of maintaining a good performance of reading an original while preventing the lamp from blackening, by lighting the lamp at a low voltage.

To these ends, the present invention provides an original reading apparatus having:

a lamp for illuminating an original;

a reading means for reading the original illuminated by the lamp; and a control means adapted to apply to the lamp a predetermined voltage after reading of an image formed on the original has been completed, if a voltage applied to the lamp at the time of the original image reading is lower than a standard voltage; the predetermined voltage being higher than the voltage applied to the lamp at the time of the original image reading.

Other objects and features of the present invention will become clear upon reading the following description.

DESCRIPTION OF THE PREFERRED EMBODIMENTS

Figure 1:
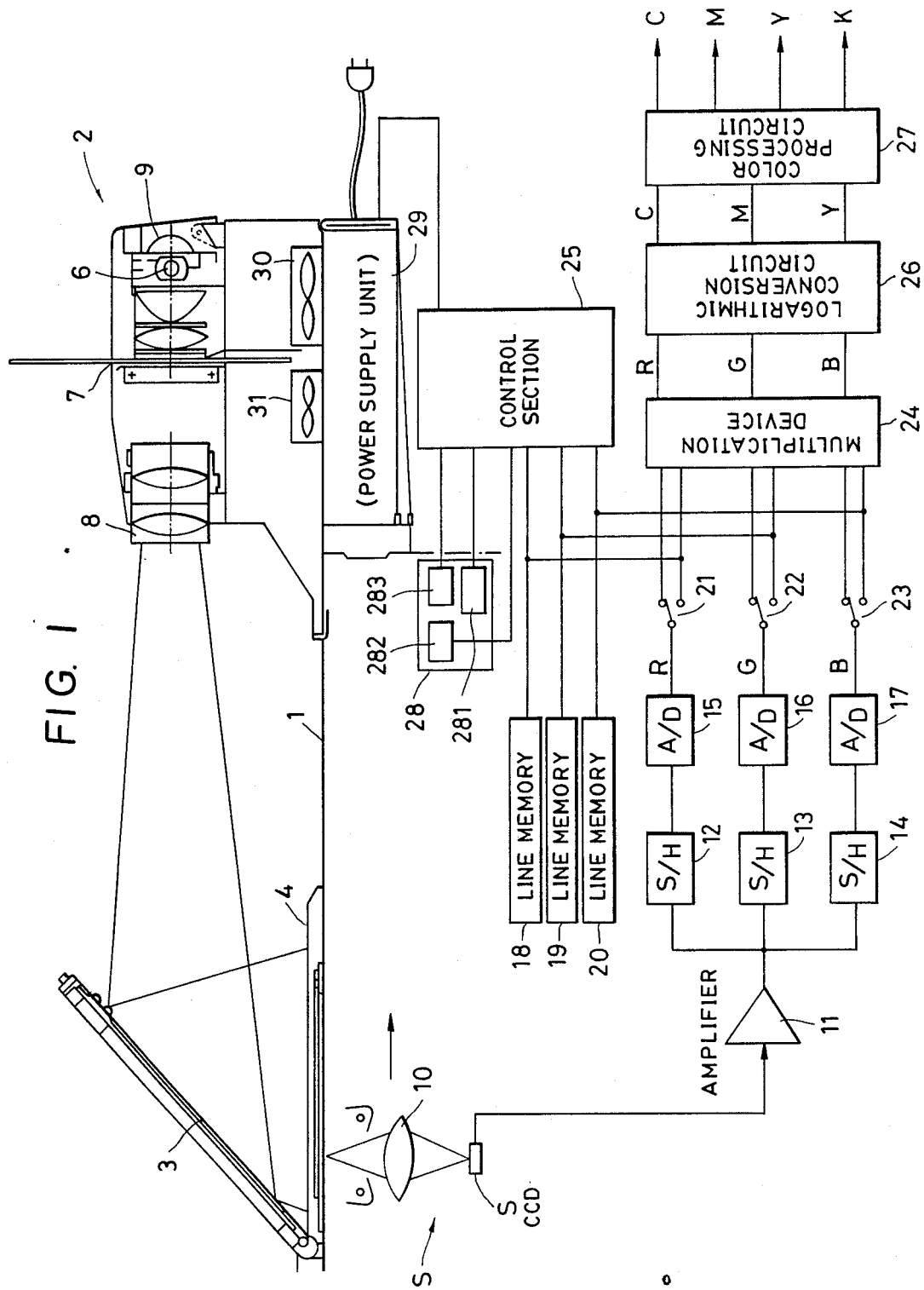
FIG. 1 is a diagram of the construction of an image projecting apparatus which represents an embodiment of the present invention.

Referring to FIG. 1, an apparatus which represents an embodiment of the present invention is constituted by an original table 1, a projecting unit 2, a reflection mirror 3, a fresnel lens 4 placed on the original table 1 and used as a surface on which an image is projected, and a photoelectric conversion element 5 such as a CCD (charge coupled device) provided as a reading means.

The projecting unit 2 incorporates a halogen lamp 6. A transmission film 7 is provided as an original is illuminated by the halogen lamp 6 from the rear side. An image transmitted through a lens 8 is reflected on the reflection mirror 3, and is projected on the fresnel lens 4 that functions as a field lens. A reflector 9 is adapted to reflect the light from the halogen lamp 6 in a desired direction (direction of film 7). The transmission film 7 may be a color negative film or a color positive film (reversal film). The fresnel lens 4 has a lower surface which contacts the original table 1 and which serves as a light diffusing surface.

Figure 2:
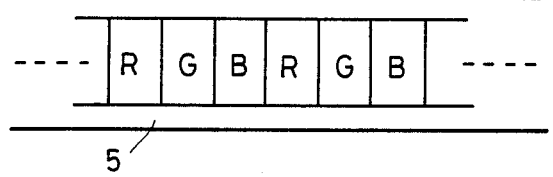
FIG. 2 is a diagram of an operation of a CCD in accordance with the embodiment shown in FIG. 1.

An image projected on the fresnel lens 4 is transmitted through the fresnel lens 4 and is formed on the CCD 5 by an image forming lens 10. The CCD 5 is a line sensor constituted by picture elements which are disposed in a line and to which color separation filters R (red), G (green), and B (blue) are applied, as shown in FIG. 2. The CCD 5 outputs signals at voltages which are in proportion to the amounts of light received by the picture elements. To read an original, a movable scanning means S which is constituted by the lens 10 and the CCD 5 integral with each other moves in the direction of the arrow so as to scan the image of the original projected on the fresnel lens 4. Each time one cycle of scanning of the original is completed, the movable scanning means S moves in the direction opposite to the arrowed direction and returns to the home position. In a one-cycle original scanning process, the scanning means moves in the arrowed direction four times and scans the original image four times in order to obtain items of data R (red), G (green), B (blue), and K (black) in succession.

Voltage signals output from the CCD 5 are amplified by an amplifier 11, are sampled and held by S/H (sample and hold) circuits 12, 13, and 14, and are thereafter converted by A/D converter circuits 15, 16, and 17 into digital signals corresponding to the items of color data R, G, and B. Line memories (RAMs) 18, 19, and 20 corresponding to the picture elements relating to the items of data R, G, and B are provided, which are used to store items of data in correspondence with the array of the picture elements of the CCD 5, thereby compensating for variations of the sensitivity of the CCD 5 and for unevenness and excess or shortage of the amount of light for original illumination.

Selectors 21, 22, and 23 function to change over signals supplied from the picture elements relating to the data items R, G, and B to the line memories 18, 19, and 20 (to the left side of the diagram) at the time of formation of a shading compensation signal or formation of a lamp voltage compensation signal, or to a color processing circuit 27 (to the right side of the top of the diagram) at the time of image reading. The change-over operation of the selectors 21, 22, and 23 is conducted in response to a signal supplied from a control section 25.

A multiplying device 24 performs calculations on the basis of image signals and a shading compensation signal so as to correct for variations in the image signals output from the CCD 5 in the direction of main scanning thereof. The multiplying device 24 supplies a logarithmic conversion circuit 26 with image signals corresponding to the data items R, G, and B. The logarithmic conversion circuit 26 performs logarithmic conversion of the image signals corresponding to the data items R, G, and B into density signals C (cyan), M (magenta), and Y (yellow), and supplies the image signals Y, M, and C to the color processing circuit 27 which performs color processing, including masking correction, inking, and UCR (undercolor removal).

The control section 25 supplies a power supply unit 29 with a control signal for changing the voltage applied to the halogen lamp 6. This control signal is determined from data obtained by directly accessing the line memories 18, 19, and 20 on the basis of an instruction supplied from an operation button 282 in an operation section 28. The apparatus is also provided with fans 30 and 31 which are adapted to cool the halogen lamp.

In the above-described arrangement, before the operation of reading the original is started, the transmission film 7 is illuminated by the halogen lamp 6 lighted at a reference voltage of, e. g., 24V; an image projected on the fresnel lens 4 is preliminarily read by the CCD 5; and data obtained by this preliminary reading with respect to one line is stored in the line memories 18, 19, and 20. In an original reading mode set after the preliminary reading, the control section 25 changes the voltage applied to the halogen lamp 6 on the basis of the original density data stored in the line memories 18, 19, and 20, and thereby controls the amount of light emitted from the halogen lamp 6 so that the image is projected on the fresnel lens 4 with an illuminance most suitable for image reading.

If the amount of light emitted from the halogen lamp 6 is controlled and adjusted to a suitable value in the above-described manner, the image reading performance can be continually optimized. For instance, in a case where the transmission film 7 is a negative film, the amount of light from the halogen lamp is increased if the negative film is formed by over-exposure; or the amount of light from the halogen lamp is reduced if the negative film is formed by under-exposure, thereby forming an projected image with a suitable illuminance.

If the transmission film 7 is a positive film, it is necessary to reduce the amount of light from the halogen lamp because the optical transmittance of the film is so high that there is no masking with respect to orange as in the case of the negative film. In a case where the film is formed by over-exposure, the optical transmittance is still higher and it is possible to obtain a projected image with an illuminance suitable for image reading by markedly reducing the amount of light from the halogen lamp.

This embodiment also exemplifies control of the following operation as well as the above-described arrangement and functions. That is, if the voltage applied to the halogen lamp when the CCD 5 reads the image is lower than a standard voltage previously stored in the control section 25, e. g., 28V, the control is performed in such a manner that a predetermined voltage higher than that at the time of the image reading, e. g., 32V is applied to the halogen lamp 6 for only a certain period of time, e. g., 5 sec. immediately after the image reading has been completed. In this case, it is preferable to set the standard voltage to a level which is slightly lower than the rated voltage of the halogen lamp 6 and at which the lamp does not blacken easily. The predetermined voltage applied for a certain period of time immediately after the completion of image reading is set to a level which is close to the rated voltage of the halogen lamp 6 and at which there is substantially no possibility of blackening of the lamp.

The above-described control enables an increase in the temperature in the halogen lamp tube so as to vaporize and eliminate halogen compounds attached to the inner surface of the lamp wall when the halogen lamp is used at a voltage lower than the rated voltage, thereby ensuring that the image can be projected with a suitable amount of light constantly even from the start of the next image reading operation and that the image can be read with a suitable density.

Figure 3:
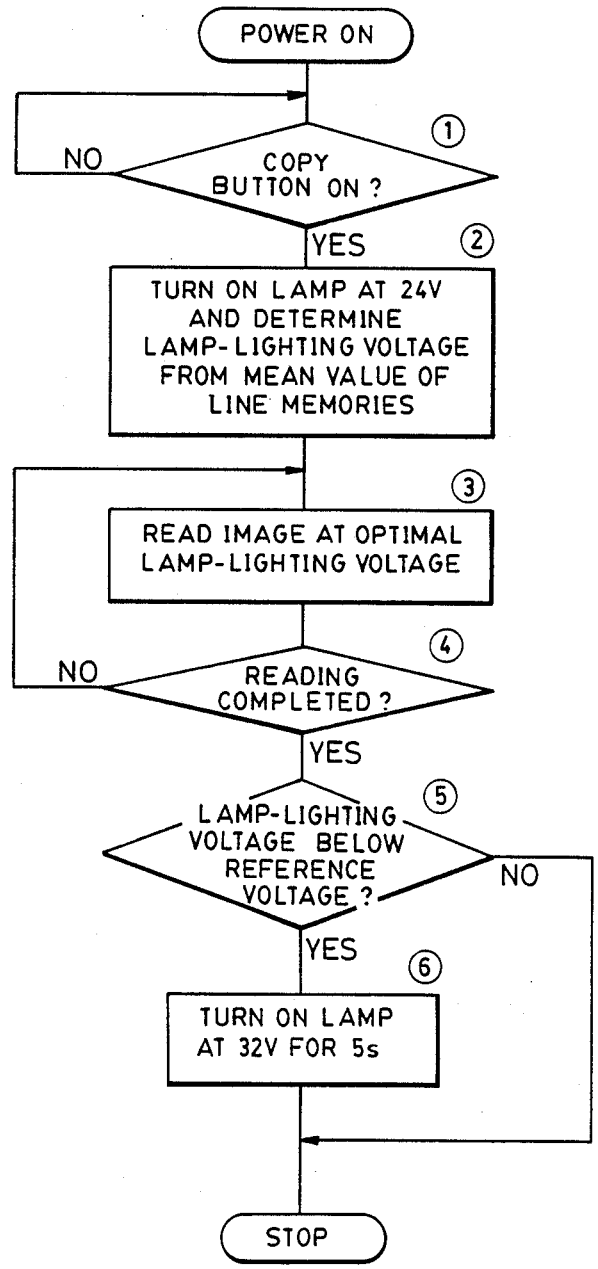
FIG. 3 is a flow chart of the operation of the embodiment shown in FIG. 1.

The operation of this embodiment will be described more in detail with reference to FIG. 3 which is a flow chart of the operation. A copy button 281 is first pressed for switching-on in step 1 while the power supply of the apparatus is in the on state. In response to this operation, the control section 25 turns on and lights up the halogen lamp at a reference voltage, e. g., 24V, and, in step 2, determines an optimal lamp lighting voltage from the mean value of image data supplied from the CCD 5 and stored in the line memories 18, 19, and 20. The image is read at this optimal lamp lighting voltage in step 3, and the control section 25 judges in step 4 whether or not the reading has been completed. After the reading has been completed, the control section 25 judges, in step 5, whether or not the lamp lighting voltage at the time of this image reading is lower than a predetermined standard voltage (e. g., 28V). If NO, the control unit 25 immediately stops the operation of the apparatus or, if YES, it lights up the lamp at 32V for 5 sec. in step 6 in order to prevent the lamp from blackening, and thereafter terminates the operation of the apparatus. In accordance with this embodiment, even if the type of film is not previously input, the voltage at which the lamp is lighted after the image reading is automatically controlled in accordance with the illuminance of the projected image, thereby eliminating the possibility of blackening of the lamp in a suitable manner and enabling the image to be projected constantly with a suitable amount of light.

Figure 4:
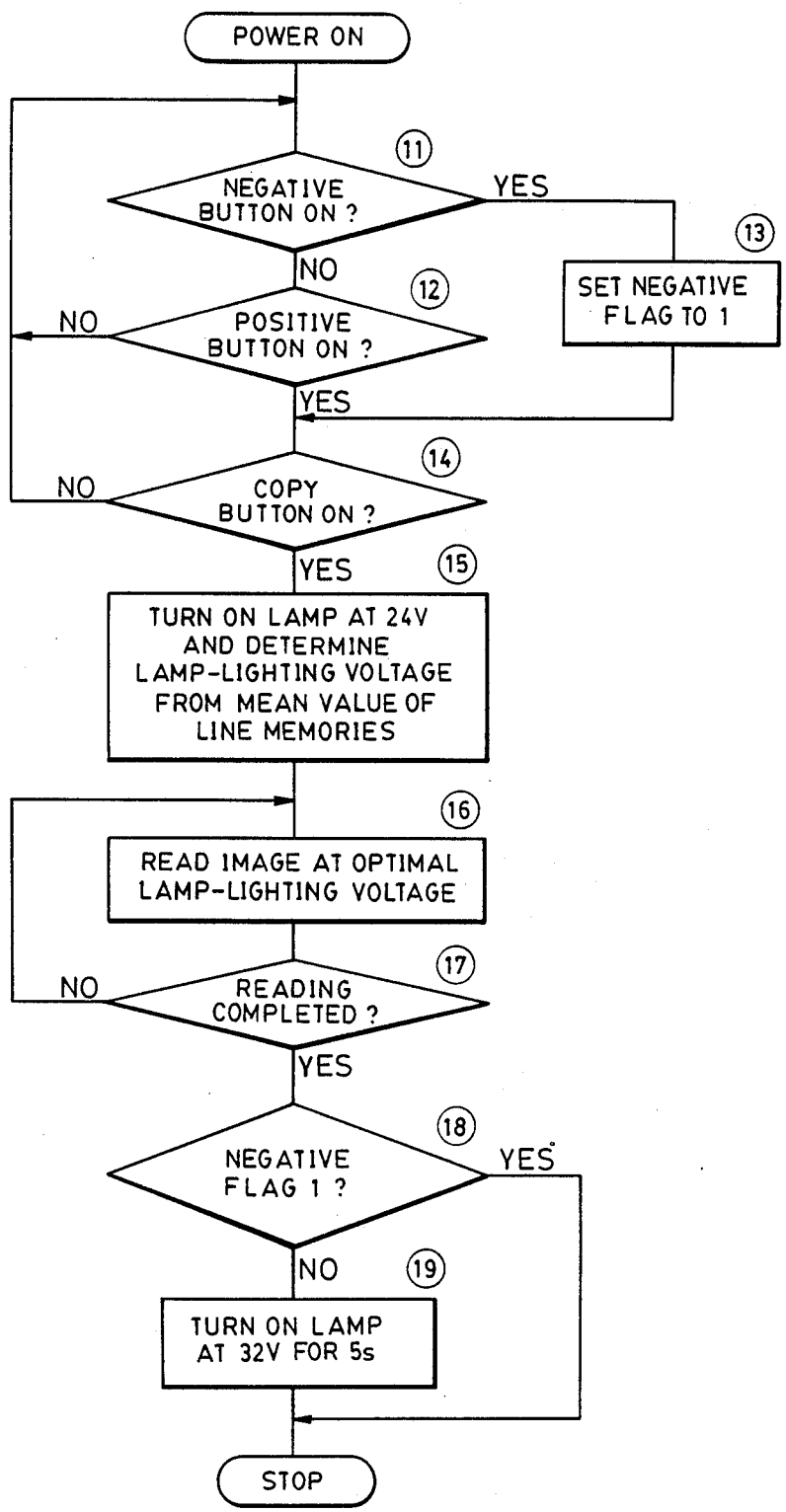
FIG. 4 is a flow chart of the operation of another embodiment of the present invention.
Figure 5:
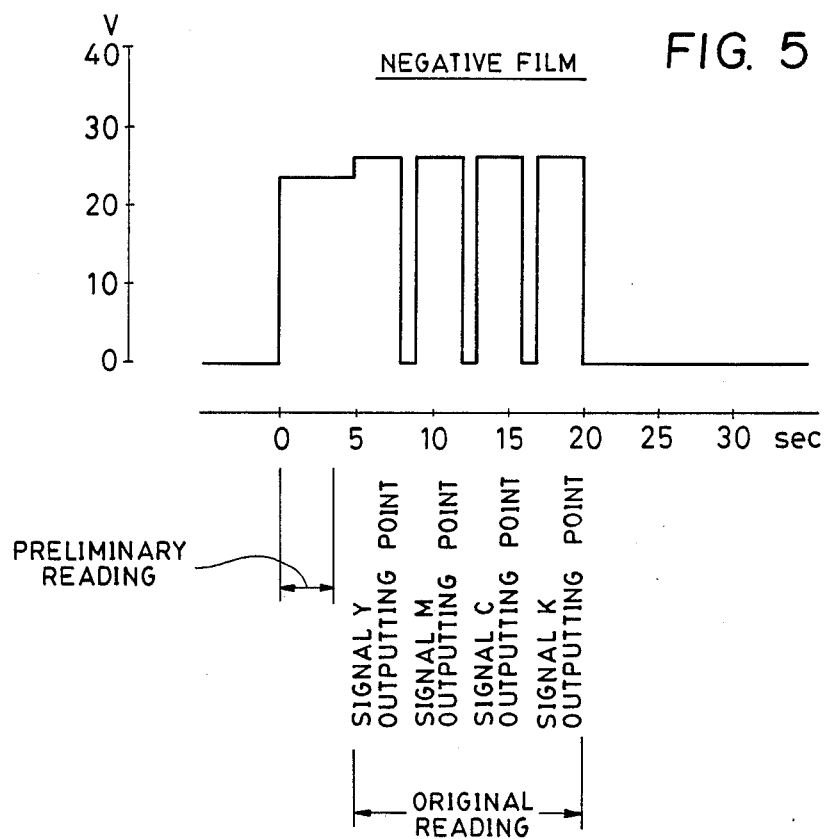
FIG. 5 is a graph of changes with time in the voltage applied to a halogen lamp in the case of use of a positive film in the embodiment shown in FIG. 4.
Figure 6:
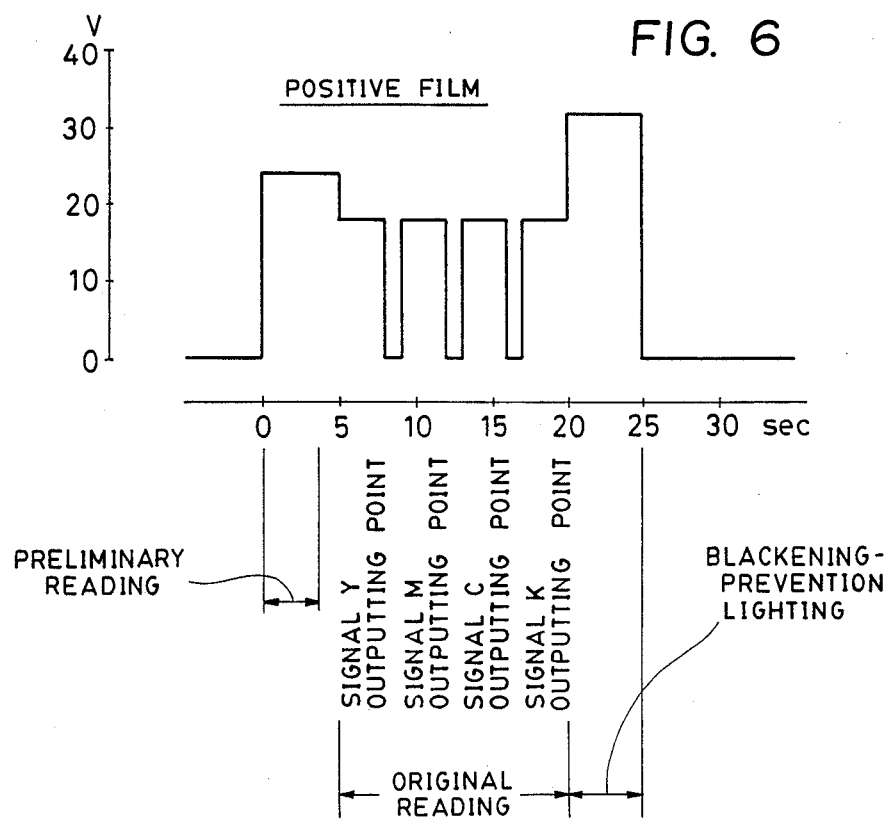
FIG. 6 is a graph of changes with time in the voltage applied to the halogen lamp in the case of use of a negative film in the embodiment shown in FIG. 4.

FIG. 4 is a flow chart of the operation of another embodiment of the present invention in which execution of the lamp voltage control after image reading is determined by manual operation. In this respect, this embodiment differs from the embodiment shown in FIG. 3. That is, the apparatus is designed to perform, for the positive film only, the lamp lighting voltage control after image reading in consideration of the fact that, in general, the amount of light by which an image on a positive film is projected is lower than that by which an image on a negative film is projected. In step 11, while the power supply of the apparatus is in the on state, the operator first selects a negative button 282 by judging that the film is a negative film, and the negative flag is set to 1 in step 13. If the film is not a negative film, the operator selects a positive button 283 by judging that the film is a positive film, in step 12. After the copy button 281 has been pressed for switching-on in step 14, the control section 25 turns on and lights up the halogen lamp at 24V, and determines, in step 15, an optimal lamp lighting voltage from the mean value of image data supplied from the CCD 5 and stored in the line memories 18, 19, and 20. The image is read at this optimal lamp lighting voltage in step 16, and the control section 25 judges in step 17 whether or not the reading has been completed. The control section 25 then judges in step 18 whether or not the negative flag is 1. If the negative flag is 1, that is, a negative film has been used, the operation of the apparatus is immediately stopped, as shown in FIG. 5. If the negative flag is not 1, that is, a positive film has been used, the lamp is lighted at 32V for 5 sec. in step 19, as shown in FIG. 6, so that it is prevented from blackening. The operation of the apparatus is thereafter stopped. In accordance with this embodiment, the lighting control is not performed when a negative film is used. However, the control procedure is thereby simplified and this method is therefore suitable for low-cost design.

FIGS. 5 and 6 show examples of the voltage applied to the lamp with respect to negative and positive films in accordance with the second embodiment.

In the above embodiment, as shown in FIG. 6, the voltage applied to the halogen lamp at the time of image reading is temporarily lowered to 0V between periods of time for output of color signals (Y, M, C, K). Instead, a rated voltage may be applied between these periods, thereby further improving the effect of eliminating blackening of the tube wall.

In accordance with the present invention, as described above, if the voltage applied to the halogen lamp at the time of image reading is so low that there is an increased possibility of the lamp being blackened, a voltage higher than that applied at the time of image reading is applied to the halogen lamp for a certain period of time after the image reading has been completed. The temperature of the wall of the halogen lamp tube is thereby increased and the halogen cycle inside the tube is normally activated, thereby vaporizing halogen compounds attached to the tube wall. It is therefore possible to improve the image reading performance by illuminating the original constantly with a desired illuminance.

The present invention can also be applied to a type of apparatus for reading a reflective original such as a sheet of paper.

What is claimed:

1. An original reading apparatus comprising:
a lamp for illuminating an original;
reading means for reading an image formed on the original illuminated by said lamp; and
control means adapted to apply to said lamp a first predetermined voltage after reading of the image formed on the original has been completed, if a voltage applied to said lamp at the time of the original image reading is lower than a second predetermined voltage, said first predetermined voltage being higher than said voltage applied to said lamp at the time of the original image reading.

2. An original reading apparatus according to claim 1, wherein said first predetermined voltage is set to a level at which said lamp can be prevented from blackening.

3. An original reading apparatus according to claim 1 or claim 2, wherein said control means applies a reference voltage to said lamp before the operation of reading the image from the original is started, and said control means determines the voltage applied to said lamp at the time of the original image reading on the basis of information on density of the original measured when the original is illuminated by said lamp lighted at said reference voltage.

4. An original reading apparatus according to claim 3, wherein said lamp includes a halogen lamp.

5. An original reading apparatus according to claim 4, wherein the original is of a transmission type.

6. An original reading apparatus comprising:
a lamp for illuminating a transmission type of original;
reading means for reading an image formed on the original illuminated by said lamp;
means for forming a signal for discriminating whether the original to be read is a positive original or a negative original; and
control means adapted to apply to said lamp a predetermined voltage for a predetermined period of time after reading of the image formed on the original has been completed, if the original is a positive original.

7. An original reading apparatus according to claim 6, wherein said predetermined voltage is set to a level at which said lamp can be prevented from blackening.

8. An original reading apparatus according to claim 6 or claim 7, wherein said control means applies a reference voltage to aid lamp before the operation of reading the image from the original is started, and said control means determines a voltage applied to said lamp at the time of the original image reading on the basis of information on density of the original measured when the original is illuminated by said lamp lighted at said reference voltage.

9. An original reading apparatus according to claim 6 or claim 7, wherein said lamp includes a halogen lamp.

* * * * *

UNITED STATES PATENT AND TRADEMARK OFFICE
CERTIFICATE OF CORRECTION

PATENT NO. : 4,958,240
DATED : September 18, 1990
INVENTOR(S) : Shunichi Abe

It is certified that error appears in the above-identified patent and that said Letters Patent is hereby corrected as shown below:

COLUMN 3:

Line 22, "top of the" should be deleted.

COLUMN 6:

Line 6, "claimed:" should read --claimed is:--.

Line 54, "aid" should read --said--.

Signed and Sealed this

Thirtieth Day of June, 1992

Attest:

DOUGLAS B. COMER

Attesting Officer

Acting Commissioner of Patents and Trademarks